United States Patent [19]
Moore

[11] Patent Number: 5,203,845
[45] Date of Patent: Apr. 20, 1993

[54] COMPUTER MOUSE SUPPORT

[75] Inventor: Edward Moore, L'Acadie, Canada

[73] Assignee: 2749394 Canada Inc., Montreal, Canada

[21] Appl. No.: 802,524

[22] Filed: Dec. 5, 1991

[51] Int. Cl.$^5$ .............................................. B68G 5/00
[52] U.S. Cl. .................................... 248/118; 248/918; 340/710
[58] Field of Search ............... 248/118, 118.1, 118.3, 248/118.5, 918, 921, 188.2; 273/148 B; 400/715; 340/710

[56] References Cited

U.S. PATENT DOCUMENTS

| | | | |
|---|---|---|---|
| Re. 33,556 | 3/1991 | Berke | 268/118 |
| 489,518 | 1/1893 | Ambruster | 248/118 X |
| 1,590,479 | 6/1926 | O'Neill | 248/118.1 |
| 2,561,001 | 7/1951 | Ward | 248/118 |
| 2,584,352 | 2/1952 | Kern | 248/118.3 |
| 2,633,373 | 3/1953 | Marano | 40/120 |
| 3,123,403 | 3/1964 | Hood | 248/118 |
| 3,365,070 | 1/1968 | Miles | 248/146 |
| 3,595,513 | 7/1971 | Rehlaender | 248/148 X |
| 3,885,762 | 5/1975 | Sebastiani | 248/346 X |
| 4,304,318 | 12/1981 | Webb | 248/188.2 X |
| 4,483,634 | 11/1984 | Frey et al. | 400/715 X |
| 4,543,571 | 9/1985 | Bibrey et al. | 340/710 |
| 4,545,554 | 10/1985 | Latino et al. | 248/118.1 |
| 4,621,781 | 11/1986 | Springer | 400/715 X |
| 4,799,054 | 1/1989 | House | 340/710 |
| 4,830,320 | 5/1989 | Bellouis | 248/188.2 |
| 4,870,440 | 9/1989 | Frost | 248/188.2 X |
| 4,973,176 | 11/1990 | Dietrich | 248/118 X |
| 5,040,757 | 8/1991 | Benaway | 248/918 X |
| 5,056,743 | 10/1991 | Zwar et al. | 248/118 |
| 5,088,668 | 2/1992 | Grimm | 248/118.3 |

FOREIGN PATENT DOCUMENTS 44814 10/1917 Sweden .......................... 248/118.1

Primary Examiner—Alvin C. Chin-Shue
Assistant Examiner—Korie H. Chan
Attorney, Agent, or Firm—McFadden, Fincham, Marcus & Anissimoff

[57] ABSTRACT

There is disclosed a device having a working surface for a computer mouse which comprises: a supporting structure having a forward end; a rear end; a pair of sides; a generally planar top working surface; and a bottom surface adapted for engagement with a supporting surface. The planar top working surface is adapted to receive a mouse and extends from the forward end to the rear end in an upwardly inclined orientation. A wrist-/palm support member is provided in cooperative engagement with the forward end.

12 Claims, 3 Drawing Sheets

COMPUTER MOUSE SUPPORT

The present invention relates to a work surface and supporting structure for computer accessories, such as a mouse.

More specifically, the present invention relates to an inclined work surface and supporting structure having a wrist support for use with a computer mouse.

A large number of computer systems are now being utilized by many businesses and individuals. Together with such computer systems has been the introduction of many accessories and tools such as the "mouse" which is now widely in use by computer operators. The "mouse" is a small hand operated device which controls the cursor on a computer screen by effecting movement of the mouse to desired positions on a work surface to effect the desired movement of the cursor. A "mouse" typically has some form the undersurface thereof to permit easy gliding of the same across a work surface.

Work surfaces for a computer mouse are known. Such work surfaces are utilized to protect a desk top or like surface from scratches as well as to protect the mouse mechanism from contaminants. One such known work surface consists of a flat mat/work surface, typically of a foam type material, which has a flat planar top surface which permits gliding of the computer mouse thereacross. The foam mat may be covered with a material, such as nylon, to aid in the gliding movement of the mouse. Another known working surface consists of a flat planar surface of a plastic material. The mat/work surface is typically placed on a desk top or other surface in a position which is easily accessible by a computer operator. A computer operator will use his hand to effect the desired movement of the mouse on the work surface.

The above-mentioned known types of supporting-/work surfaces are disadvantageous in that when 10 a mouse is used for long periods of time by a computer operator the hand, wrist and arm of the operator can become tired and stiff due to the required positioning of the same to effect movement of the mouse to the desired positions on the support mat/work surface.

One feature of an embodiment of the present invention is to provide a mouse working surface which can be used comfortably by a computer operator over long periods of time.

In accordance with an embodiment of the present invention there is provided a device having working surface for a computer mouse which comprises: a supporting structure having a forward end; a rear end; pair of sides; a generally planar top working surface; and a bottom surface adapted for engagement with a supporting surface; the planar top working surface being adapted to receive a mouse and extending from the forward end to the rear end in an upwardly inclined orientation; and a wrist support member in cooperative engagement with the forward end.

It is a particularly preferred feature of the device of the present invention that, in combination with the above noted feature of a sloped work surface extending from the forward end to the rear end, a second slope or angle is provided to the work surface. This complements the normal angle of a user's arm during operation of the mouse, in order to provide for comfort any ease of operation. To this end, in the case of a right handed mouse operator, the working surface may also advantageously slope upwardly from the right side to the left side and vice versa for a left handed operator.

With respect to the slope extending from the forward end to the rear end, preferably the angle of repose of the work surface, relative to a flat surface such as a desk top, is from about 2° to about 45°, and more desirably, between 5° and 25°.

With respect to the side to side slope noted above, similar angles to those described above with respect to the forward end to rear end, may be employed.

By virtue of the above construction, in a preferred embodiment, a direction of slope in the two principle directions (i.e. side to side and front to back) are provided in the device of the present invention.

The work surface may be of any suitable shape; typically, these will be of a circular, rectangular or polygonal configuration. Desirably, this work surface is generally flat and smooth. In general, the work surface is mounted on a suitable supporting body which includes a side wall structure such as a continuous wall, opposed side walls or the like. The side walls may be formed as discontinuous walls by virtue of supporting struts, rods, or the like, extending between a lower peripheral wall of the device and the work surface. In the alternative, the work surface may have supporting legs extending downwardly therefrom which legs are adapted to contact a supporting surface such as a desk top or the like.

In preferred embodiments, the device may comprise an integral one-piece unit as, for example, would be produced by an injection molding technique; in such a case, the working surface may be provided with a covering layer of material which aids in reducing the friction between a mouse and the surface. In such a case, a layer of suitable foam material may be included beneath the covering layer to In producing a one-piece injection molded unit of suitable plastic material, the working surface will normally be formed as an integral cast unit. Preferably, the working surface will be of a smooth planar matrix extending between the side walls or the surrounding walls; in other embodiments, a border may be produced which is adapted to receive a planar working surface supported by the border which in turn, may mount the foam and covering layers.

In place of forming the unit of plastic, it may also be formed of a metal material as for example by casting, sheet metal bending, punch operations or the like. As indicated above, a foam layer with a covering layer may also be applied. Typical metals from which the device may be made of include steel or steel alloys, aluminum, cooper or the like; in other arrangements, a metal buoy may be provided which may also be provided with a protective polymeric layer. Where a metal body is employed, a suitable ground connection may be provided for static purposes and for connection to a ground lead.

It is an important feature of the present invention that the palm or wrist support extends above and is associated with the forward end of the working surface. By positioning the palm or wrist support at the forward end of the working surface, an operator can rest his/her arm comfortably on the palm/wrist support while operating the mouse and the operator's hand will thus be level with the mouse. Thus, an operator will not have to support his wrist/arm in an awkward, uncomfortable or unusual attitude for extended lengths of time during operation of the mouse.

In still further optional embodiments of the present invention, the wrist or palm support can include a surface where there are provided movable or rotatable means such as ball bearings so that the movement of an operator's hand or arm will be facilitated to permit a gliding effect over the wrist/palm support. In another arrangement of this type, the wrist support may include a rotatable cylindrical surface such as a roller, this may be mounted by one or more brackets to the unit.

In a still further arrangement of the device of the present invention, the work surface may be separately mounted in a base frame with the two being operatively associated with each other by means of a ball and socket arrangement, a pivot arrangement, or by a spring loading arrangement, so that the upper working surface as free to assume an angular orientation by depressing or fixedly securing the upper surface through appropriate locking means once the desired angle of orientation has, been achieved. In this manner, bidirectional sloping can be achieved through a mechanical system.

Having thus generally described the invention, reference will now be made to the accompanying drawings, illustrating preferred embodiments of the invention, wherein.

Figure 1:
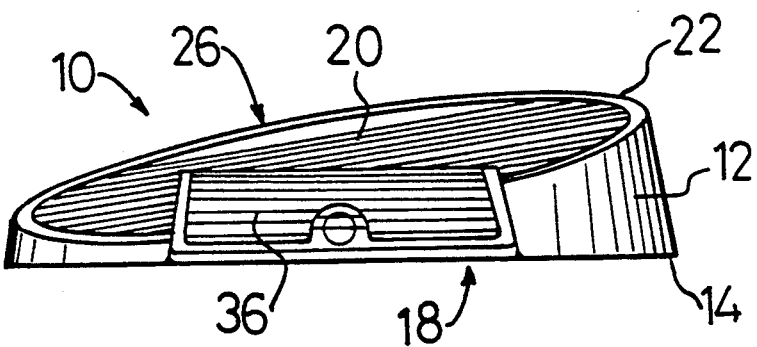
FIG. 1 is, a front elevational view of one embodiment of the present invention.

Referring initially to 1 through 3, a device of the present invention is illustrated, which includes a generally circularly shaped housing 10 with a continuous side wall 12 which is angularly tapered to extend inwardly and upwardly from the base portion 14 which is adapted to rest or sit on a desk or like surface. The device, at its front end, indicated generally by reference numeral 16, includes a further portion or body member indicated generally by reference numeral 18 extending therefrom, and which in turn is adapted to form a wrist-/palm rest member.

The housing 10 surrounds a central area which comprises a generally planar work surface 20 on which the computer mouse is adapted to lie and move on. This surface can be integrally formed with the housing 10 or may be separately formed. As described previously, the surface 20 may be one of several different types including a reflective surface adapted to transmit and receive radio waves, laser beams, or the like, or where it is not used for that purpose, the surface 20 may be a generally smooth surface on which the mouse, which may include a roller bearing or the like, can glide about the surface 20.

The upper wall of the housing 10 may include a border 22 surrounding the work surface 20; the border may be coextensive with the work surface 20 or may project thereabove.

As will be best seen from FIG. 1, the device of the present invention includes a first slope extending from the forward end 16 and tapering upwardly and outwardly to the rear end 26. This slope will also be evident from the difference in the height of the side wall 12 as it extends upwardly from the forward end 16 towards the rear end 26. Typically, this slope may, in preferred embodiments, range from 5° to 25°.

FIG. 1 also shows a second slope extending upwardly and outwardly from the left to the right; likewise, this slope will preferably vary from 15° to 25°. Thus, there are two principle directions of the slope indicated by arrows 30 and 32 which intersect.

Referring to the wrist/palm support member 18, this member preferably has a generally arcuate outline 34, when viewed in side elevation. To this end, member 18 preferably includes a smooth planar surface 36 of an arcuate configuration with the forward end 38 blending into a top convex surface 40 and from there downwardy sloping by surface 42 to meet the forward end 16 of the housing 10 so as to form a smooth transition point.

Figure 2:
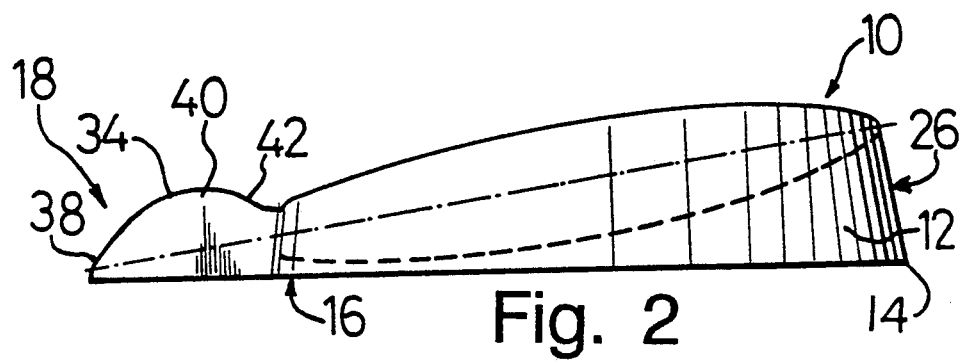
FIG. 2 is a right side elevational view of the embodiment of FIG. 1.
Figure 3:
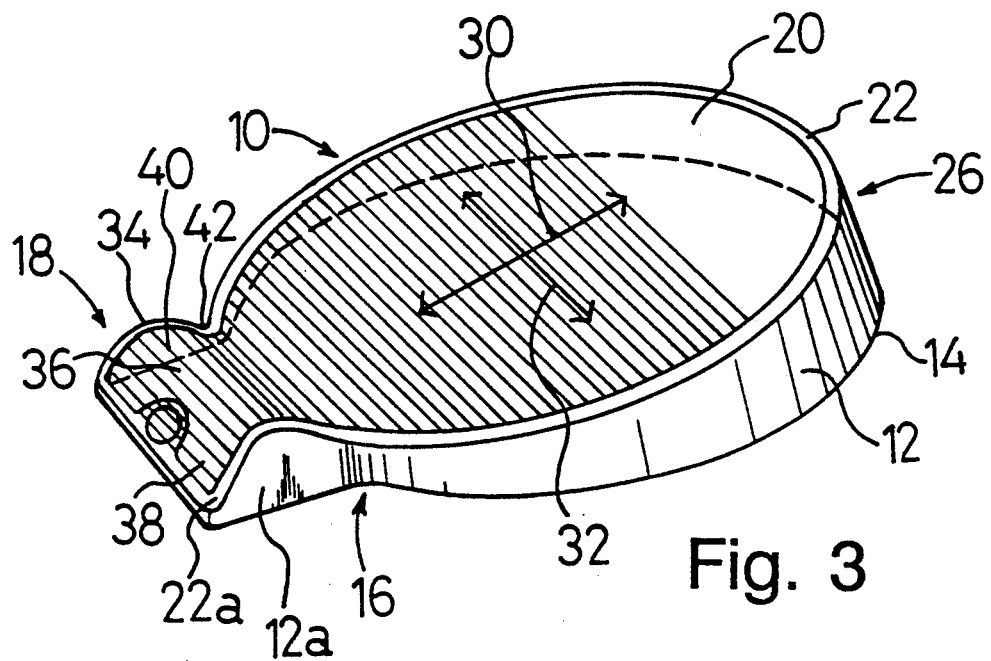
FIG. 3 is a perspective view of the embodiment of FIG. 1.

As illustrated in FIGS. 1 through 3, the housing 10 includes a peripheral side wall 12 and this side wall may extend to form the side wall 12a of the wrist/palm support. As with the case of the work surface 20, the top border 22 may likewise extend about the wrist/palm support member 18 in a border 22a.

Figure 4:
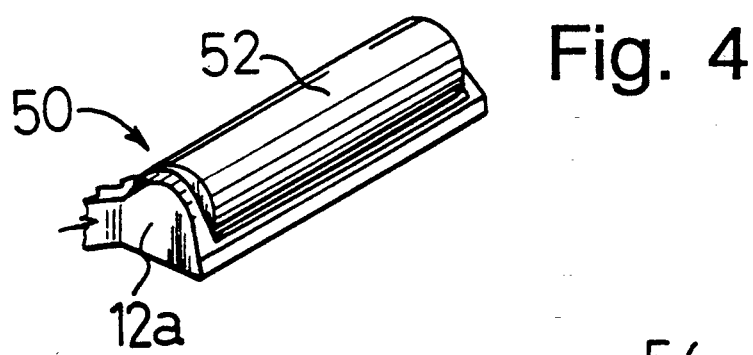
FIG. 4 is a perspective view of an alternate wrist-/palm support of the present invention.
Figure 5:
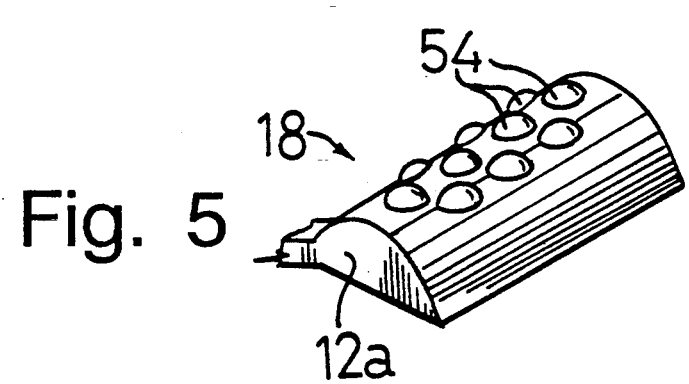
FIG. 5 is a perspective view of another alternate wrist/palm support member of the present invention.
Figure 6:
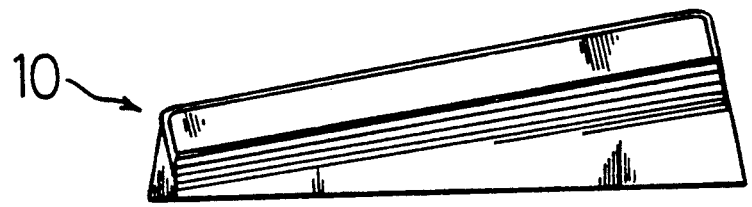
FIG. 6 is a front elevational view of a second embodiment of the present invention.
Figure 7:
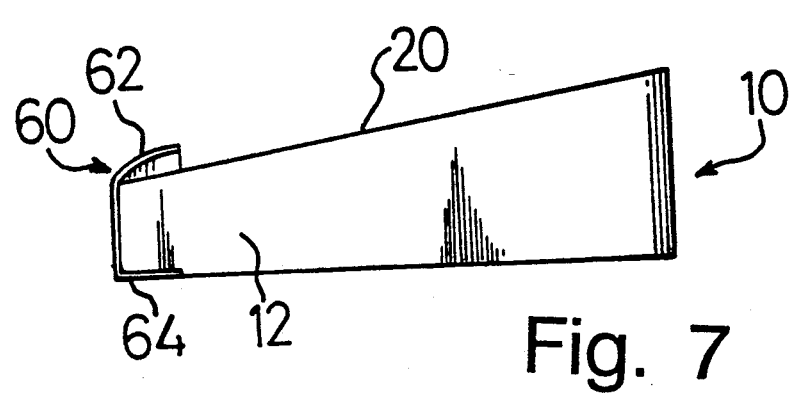
FIG. 7 is a right side elevational view of the embodiment of FIG. 6.
Figure 8:
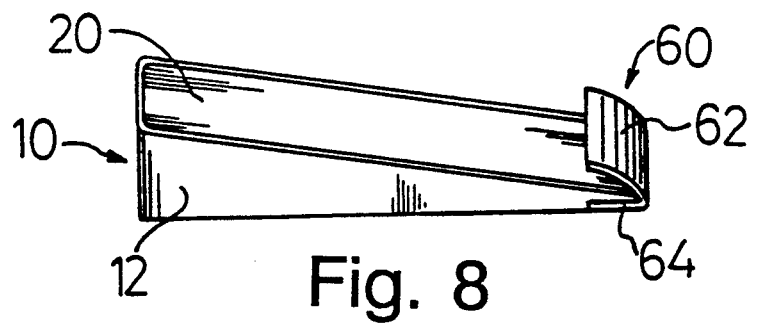
FIG. 8 is a left side elevational view of the embodiment of FIG. 6.
Figure 9:
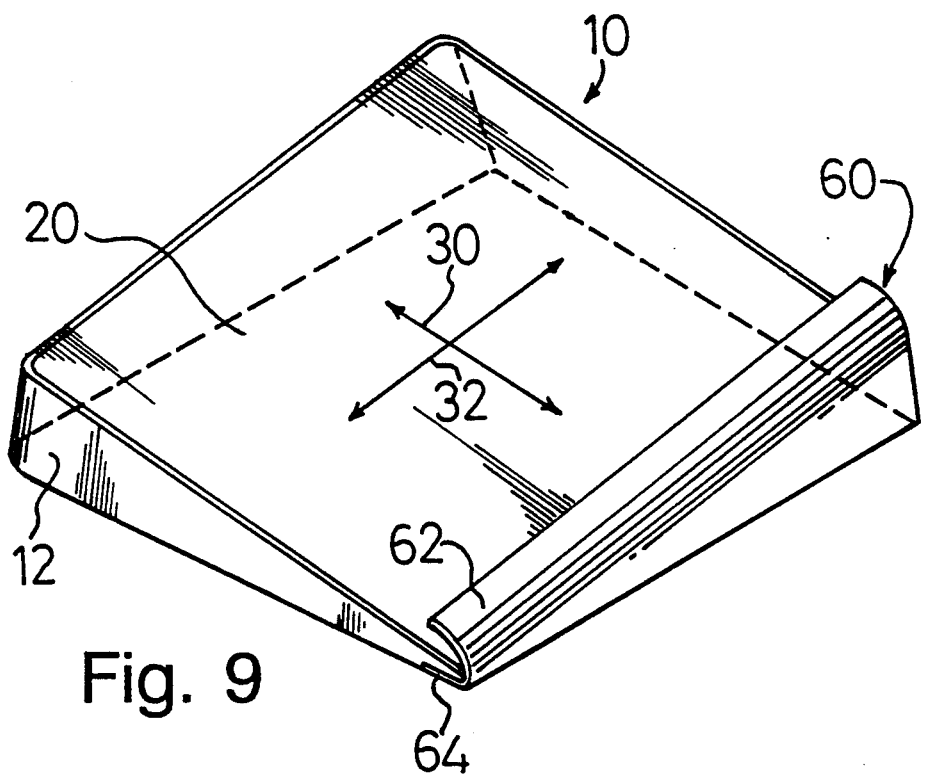
FIG. 9 is a perspective view of the embodiment of FIG. 6.

The wrist/palm support member 18 may also have alternate configurations, including those shown in FIGS. 4 and 5. FIG. 4 illustrates an alternate form of such a structure where the member 50 may be integrally attached to the body 10 but which may include a roller 52 journalled between side walls 12a on a suitable shaft (not shown) so that roller 52 is freely rotatable.

In the embodiment shown in FIG. 5, the outer surface of the wrist/palm support member 18 may be provided with freely rotatable roller bearings 54 suitably journalled or mounted in the surface of the member 18.

Referring now to the alternate embodiment shown in FIGS. 6 through 9, similar reference numerals have been used to designate similar parts. In this embodiment, however, the wrist/palm support member, indicated generally by reference numeral 60 includes a yieldable portion 62 attached to a base 64 which in turn is connected to the main body of the housing 10. In this embodiment, again there are two principle directions of slope and, in addition, the wrist/palm support member 18 may likewise taper as illustrated more clearly in FIG. 9 with the direction of the taper corresponding to the direction of the arrow 32. It will be understood that this may not be required or desirable in all cases.

It will be understood that various modifications can be made to the above described embodiments without departing from the spirit and scope of the invention described herein.

I claim:

1. A device having a working surface for a computer mouse, comprising:
    a top surface and a bottom surface and sides connecting said top and bottom surfaces, said sides increasing in height from a forward end to a rearward end in a longitudinal direction;
    said top surface comprising an inclined planar working surface extending upwardly and rearwardly from said forward end to said rearward end, and adapted to receive a mouse, and a wrist support surface integral with and extending forwardly and continuously from said forward end of said planar working surface, said wrist support surface extending upwardly and forward towards said forward end, and then downwardly and forwardly towards said forward end in a convex curve, said wrist support surface being in a fixed spatial relationship with said working surface; and wherein one of said sides has a greater height than the other of said sides whereby said top working surface is upwardly inclined from one of said sides to the other of said sides in a transverse direction.

2. The device of claim 1, wherein said wrist support member includes an elongated roller.

3. The device of claim 1, wherein said wrist support member includes a plurality of rolling means.

4. The device of claim 3, wherein said plurality of rolling means are ball bearing mounted in said wrist support member with a portion protruding upwardly therefrom.

5. The device of claim 1, wherein said top working extends from said forward end to said rear end at an angle in the range of about 2° to about 45°.

6. The device of claim 1, wherein said top working surface extends from one of said pair of sides to the other of said pair of sides at an angle in the range of about 2° to about 45°.

7. The device of claim 1, wherein said top working surface comprises a foam material having a covering material thereof, said covering material adapted to aid in a gliding movement of a mouse.

8. The device of claim 1, wherein said supporting structure is plastic.

9. The device of claim 1, wherein said supporting structure is metal.

10. The device of claim 1, wherein said wrist support is adjustable.

11. A device as claimed in claim 1 wherein said top working surface comprises a surface capable of receiving and reflecting radio transmission waves.

12. A device as claimed in claim 1 wherein said top working surface comprises a surface capable of receiving and reflecting a light beam.

* * * * *